(12) United States Patent
McCormack

(10) Patent No.: US 10,311,451 B2
(45) Date of Patent: Jun. 4, 2019

(54) SYSTEM AND METHOD FOR DETERMINING DEMOGRAPHIC INFORMATION

(71) Applicant: Hoxton Analytics Limited, London (GB)

(72) Inventor: Owen McCormack, London (GB)

(73) Assignee: Hoxton Analytics Limited, London (GB)

( * ) Notice: Subject to any disclaimer, the term of this patent is extended or adjusted under 35 U.S.C. 154(b) by 0 days.

(21) Appl. No.: 15/355,652

(22) Filed: Nov. 18, 2016

(65) Prior Publication Data
US 2017/0068970 A1 Mar. 9, 2017

Related U.S. Application Data

(63) Continuation of application No. PCT/GB2015/051458, filed on May 19, 2015.

(30) Foreign Application Priority Data

May 19, 2014 (GB) .................................. 1408795.1

(51) Int. Cl.
*G06Q 30/02* (2012.01)
*G06K 9/00* (2006.01)
(Continued)

(52) U.S. Cl.
CPC ..... *G06Q 30/0201* (2013.01); *G06K 9/00362* (2013.01); *G06K 9/6202* (2013.01);
(Continued)

(58) Field of Classification Search
CPC .................................................. G06Q 30/0201
(Continued)

(56) References Cited

U.S. PATENT DOCUMENTS 7,987,111 B1 * 7/2011 Sharma .................. G06Q 30/02
705/7.29
9,355,334 B1 * 5/2016 Martinson .......... G06K 9/00369
(Continued)

FOREIGN PATENT DOCUMENTS

EP 2 207 128 A1 7/2010
JP 07-160883 6/1995
(Continued)

OTHER PUBLICATIONS

International Search Report and Written Opinion for Application No. PCT/GB2015/051458, dated Jul. 29, 2015.
(Continued)

*Primary Examiner* — Yulin Sun
(74) *Attorney, Agent, or Firm* — Marshall, Gerstein & Borun LLP

(57) ABSTRACT

With reference to FIG. 1, we provide a system for monitoring pedestrians, the system including: a data capture system including a data capture device; a computer system communicatively coupled to the data capture system and configured to receive data from the image capture system representative of a portion of a pedestrian, said portion including at least a foot or item of footwear of the pedestrian; wherein the computer system is operable to count pedestrian footfall and/or to determine a demographic property of the pedestrian based on the data representative of the foot or item of footwear of the pedestrian.

23 Claims, 5 Drawing Sheets

(51) Int. Cl.
*G06K 9/62* (2006.01)
*G06Q 10/06* (2012.01)
*G06T 7/20* (2017.01)

(52) U.S. Cl.
CPC ......... *G06K 9/6267* (2013.01); *G06Q 10/067* (2013.01); *G06T 7/20* (2013.01); *G06T 2207/30242* (2013.01)

(58) Field of Classification Search
USPC .......................................................... 348/143
See application file for complete search history.

(56) References Cited

U.S. PATENT DOCUMENTS

| | | | |
|---|---|---|---|
| 9,393,697 | B1 | 7/2016 | Beardsley et al. |
| 2012/0219184 | A1* | 8/2012 | Maki ....................... G06T 7/277 382/103 |
| 2013/0258085 | A1* | 10/2013 | Leedy ................... A43D 1/025 348/77 |
| 2014/0348382 | A1* | 11/2014 | Sasatani ............. G06K 9/00369 382/103 |
| 2014/0376780 | A1* | 12/2014 | Ueda ..................... G06T 7/0042 382/106 |
| 2015/0196231 | A1* | 7/2015 | Ziaie ...................... A61B 5/112 600/595 |

FOREIGN PATENT DOCUMENTS

| | | |
|---|---|---|
| WO | WO-02/097713 A2 | 12/2002 |
| WO | WO-2009/073198 A1 | 6/2009 |
| WO | WO-2013/059843 A2 | 4/2013 |

OTHER PUBLICATIONS

Examination Report in AU Application No. 2015263076 dated Aug. 9, 2018, 5 pages.

Office Action in JP Application No. 2017-513364 dated Aug. 13, 2018, 5 pages.

* cited by examiner

SYSTEM AND METHOD FOR DETERMINING DEMOGRAPHIC INFORMATION

This invention relates to a system, and to a method, for counting numbers of pedestrians passing through a defined space. In particular, but not exclusively, the invention relates to a system for determining demographic information relating to pedestrians entering and leaving a retail store through a doorway.

In order to improve customer experiences and to enable logical and well-reasoned business decisions to be made, retailers gather data about customers that use their stores. This data may include data relating to sales, revenue, costs, staffing numbers, footfall and demographics pertaining to individual stores and/or to the whole retail business. By 'footfall', we mean the number of people entering and/or leaving a retail store. By 'demographics', we mean properties of the people counted in the footfall figures—typically including (but not being limited to) gender and age.

There are several known methods of gathering data on retail store footfall, but generating demographic data about the customers entering the store is more difficult. Retailers have been using footfall counters at the entrances to stores for many years. By locating a footfall counter at the threshold of a shop (i.e. the entrance/exit), the retailer can record data about the times of day during which the shop is quiet or busy. This data can help management to understand store performance. Management needs to understand, for example, whether the shop is attracting more or fewer customers compared to previous weeks/months/years. Store owners may be interested in identifying the busiest and/or quietest times of the day for planning staffing requirements, or comparing the conversion performance (i.e. ratio of sales to footfall levels) of stores in different locations.

Gathering demographic data relating to the customers using each store aids understanding of the "type" of people visiting and using the shop. In this way, trends and patterns can be identified, and used to make managerial decisions. For example, it may be seen that male adults shop during their lunch hour, for formalwear, and that adult females shop for casual wear in the evenings. Managers are able to use this information to measure performance—such as establishing whether a new advertising campaign is attracting the expected demographics, or understanding the different types of customers shopping at different locations. Stores owners may also use the data to provide targeted advertising or product promotions in nearly real-time; for example if the shop is currently 80% populated with formally-dressed males, a suitable promotion or advertising strategy might be adopted for that customer demographic.

Simple footfall counters are widely available, and have been used in retail analytics for many years. A simple form of footfall counter uses an infrared beam (or two parallel beams) and an infrared sensor, located at either side of the threshold of a doorway. When a person crosses the beam, breaking the beam, the sensor detects the break and the device increments its counter. Using two beams allows the device to detect people moving either in or out of the store by the order in which the beam is broken. Other footfall counting devices include heat-sensitive detectors, or video cameras, positioned above a doorway pointing downwards, such that the devices count the number of bodies passing under the detector or camera, i.e. walking in and out of the shop.

Collecting demographic data is more difficult than counting footfall, since additional data must be extracted from the images or detected readings to establish the type or classification of the subjects. For example, rather than merely counting people walking into a store, the system must identify properties of those people—whether they are young or old, male or female, or the like.

Large retailers have been successful with loyalty card schemes to gather more detailed information on the behaviour and demographics of their customers. However, such a system requires all customers to subscribe to the scheme if the gathered data is to be representative of the true underlying behaviour of the shoppers. Facial detection and recognition systems can provide demographic data too, but these are expensive to develop. Furthermore, systems requiring analysis of images of the faces of customers have been slow to adopt commercially due to opposition on the grounds that customer privacy may be breached.

This invention relates to a system in which a footfall counting system is extended to use imaging technology and measurement methods to extract demographic data from customers walking in and/or out of a retail location by analysing footwear. In embodiments, a portion of the lower leg of the customers is also analysed.

According to an aspect of the invention we provide a system for monitoring pedestrians, the system including:
a data capture system including a data capture device;
a computer system communicatively coupled to the data capture system and configured to receive data from the data capture system representative of a portion of a pedestrian, said portion including data relating to at least a foot or item of footwear of the pedestrian;
wherein the computer system is operable to identify the presence of a pedestrian and to count the number of pedestrians observed over a time interval.

According to another aspect of the invention we provide a method of monitoring pedestrians, the method including the steps of:
capturing data representing a portion of a pedestrian using a data capture device;
communicating data representative of the portion of a pedestrian to a computer system, said portion including at least a foot or item of footwear of the pedestrian;
determining using the computer the presence of a pedestrian and, the number of pedestrians observed over a time interval.

Further features of the above aspects of the invention are described in the appended claims.

Embodiments of the invention will now be described, by way of example only, with reference to the accompanying Figures, of which:

Figure 8:
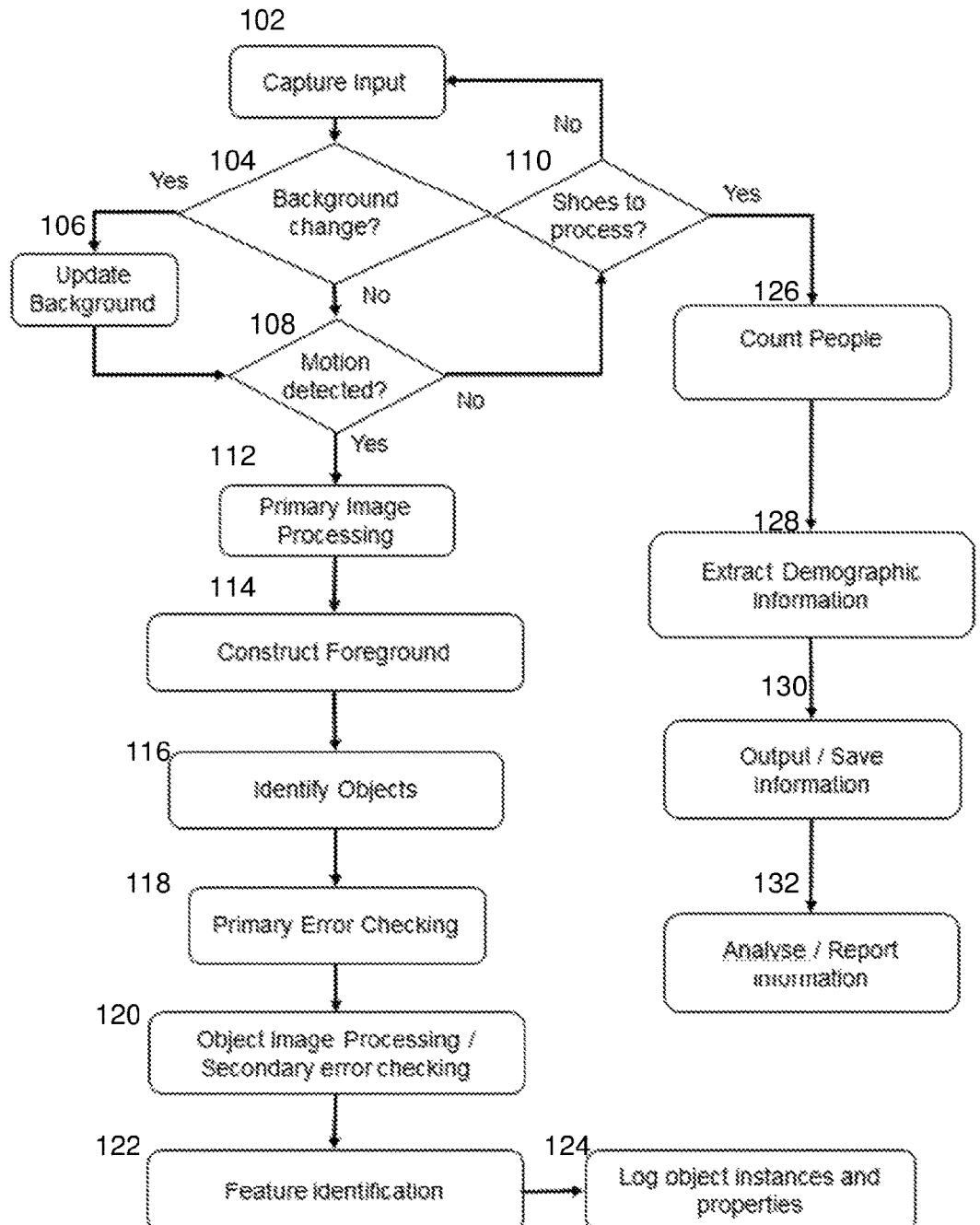

and FIG. 8 is a flow diagram representing a method according to embodiments of the invention.

Figure 1:
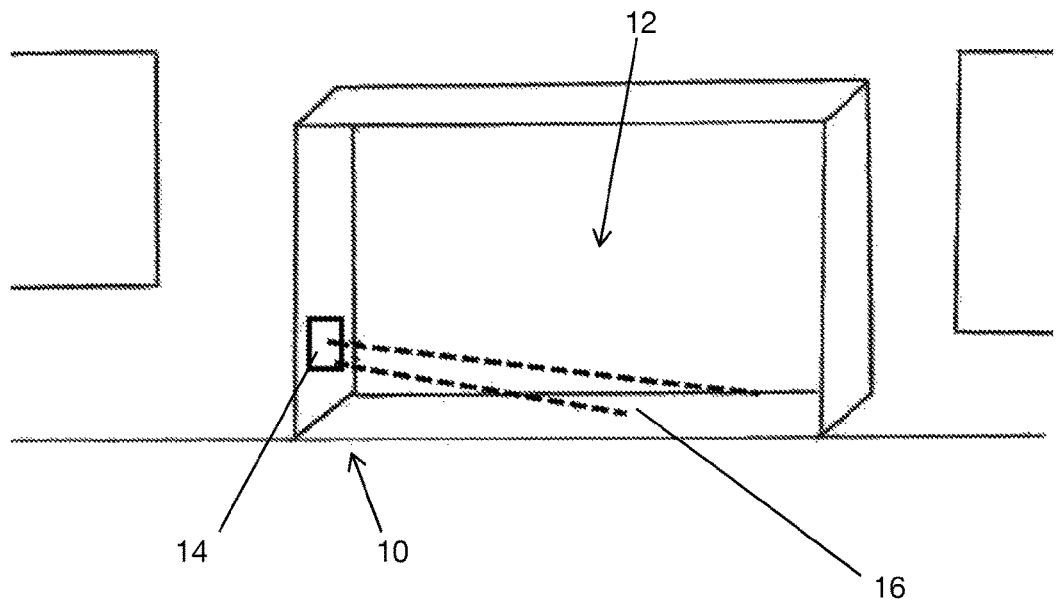
FIG. 1 is a diagram showing an image capture device disposed in relation to a target zone.
Figure 2:
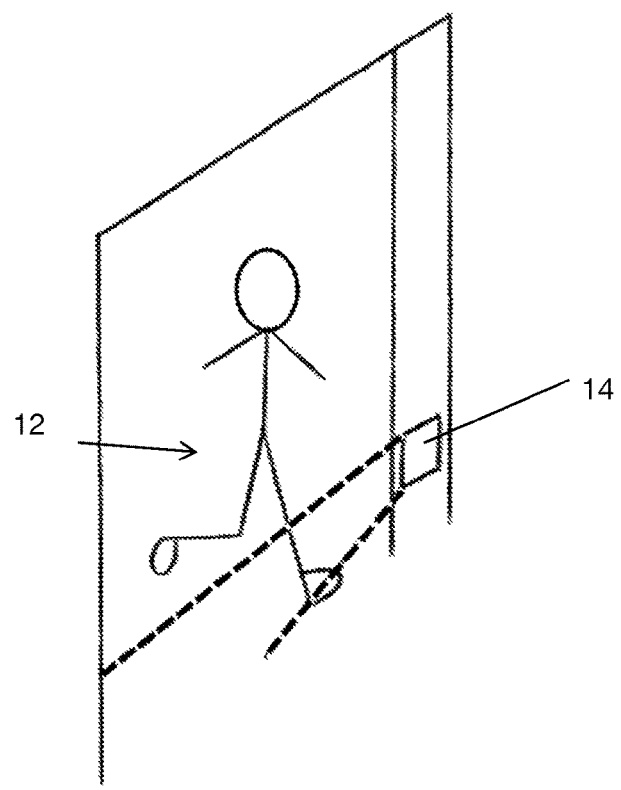
FIG. 2 is a diagram showing a pedestrian walking through a target zone.

With reference to the Figures a system 10 for monitoring pedestrians is shown. FIG. 1 shows a data capture device 14, disposed in relation to a 'target zone' 12 through which pedestrians pass. Typically the target zone is chosen to be an entrance or exit doorway to or from a retail store. Of course, the system of the invention is suitable for use in any environment through which pedestrians pass, where it is of interest to obtain footfall or demographic data relating to those pedestrians. In order to simplify the following description, we will explain the use of examples of the system in relation to a retail doorway. By 'doorway' we simply mean an entrance and/or exit point from a building or store unit, and it is not necessary that one or more doors be present. The doorway could simply be an archway, for example, or an open entranceway from an indoor shopping mall. By the term "footfall" information, we refer to information regarding the number of pedestrians observed within the target zone over a period of time.

In general terms the system 10 includes a data capture system including a data capture device 14, a computer system 32 communicatively coupled to the data capture system and configured to receive data from the data capture system 14 representative of a portion of a pedestrian, said portion including at least a foot or item of footwear of the pedestrian. The computer system 32 is operable to identify the presence of a pedestrian and to count the number of pedestrians observed over a time interval (i.e. to obtain 'footfall' information). The computer system 32 is preferably operable to determine a demographic property of the or each pedestrian based on the data representative of the foot or item of footwear of the pedestrian.

In preferred embodiments, the data capture system is an image capture system, and the data capture device 14 is an image capture device 14 (and the terms data capture device and image capture system/device will be used interchangeably herein). The data capture system may include a single data capture device 14, or may include multiple data capture devices. In preferred embodiments, the data capture device 14 is a camera capable of recording still images and/or video images. The camera may record images at predefined intervals (e.g. 1 image per 0.05 seconds, per 0.1 seconds, per 0.2 seconds, or similar). In other embodiments, the data capture device 14 may be a 2-dimensional or 3-dimensional laser scanning device. In other embodiments, the data capture device 14 may be an under-floor sensor array capable of detecting pressure, or may use light refraction to detect a footstep on a floor surface.

The term data capture device 14 is used to refer all of these, and any other suitable devices and associated methods for capturing data relating to pedestrians, including aspects of a foot or item of footwear of those pedestrians. However, for simplicity, the terms image capture system and image capture device 14 will be used from hereon to refer to the data capture system and device, respectively.

The target zone 12 is typically bounded on either side by a wall of the store, with the image capture device positioned adjacent, on, or within a wall, or at some other position at or near the entrance/exit to the store. For example, a camera may be positioned so as to capture images of the feet of pedestrians entering and/or leaving the store. The images may include portions of the legs of pedestrians in addition to the shoes and feet of pedestrians, including aspects of the clothing on the lower leg. In embodiments, the image capture device 14 is positioned at between 300 mm and 1000 mm above floor level, and preferably between 400 mm and 700 mm above floor level, and is directed across the threshold of the doorway.

A calibration step may be performed to calibrate the data capture system, or computer system 32, to account for the position of the image capture device 14 and its orientation. This calibration step may include capturing images in which a predefined projection or shape is present in the doorway, at a known location, so that the relative position of the shape or projection in the captured image can be used to provide relative information about the shape, orientation and/or position of objects captured in future images. For example, by providing the computer system 32 (or the image capture system) with data relating positions in the image field to positions across the threshold of the doorway, information such as the sizes and shapes of objects captured in future images may be calculated.

It should be noted that where image processing steps, calibration steps, identification steps, and analysis steps (or any other calculations) are described, those calculations may be performed locally using the image capture system or using the computer system 32, or performed remotely using a remote component of the computer system 32 or an additional remote computing device (such as a remote server, for example). Herein, for simplicity, we describe the system in terms such that the computer system 32 is responsible for performing processing and/or other computational steps.

Figure 5:
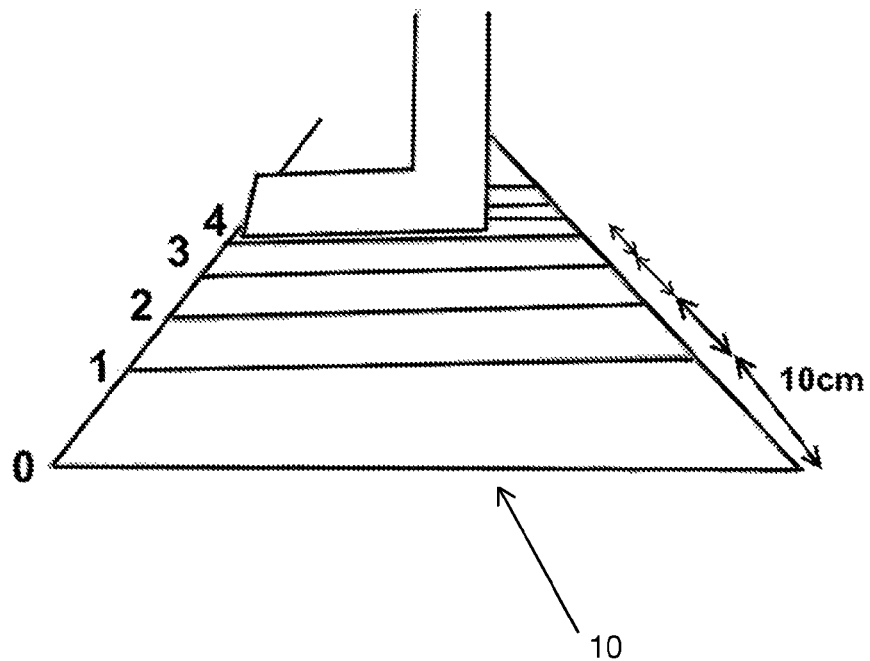
FIG. 5 is a diagram of a pedestrian foot positioned flat against the ground in relation to a target zone, for demonstrating estimation of the distance between the foot and the image capture device.
Figure 6:
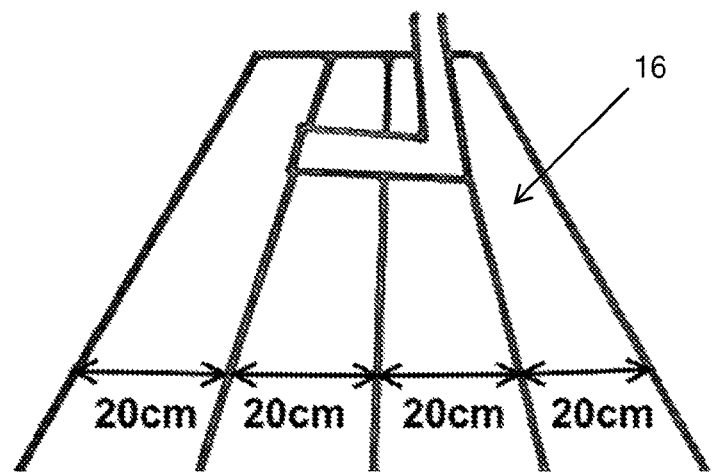
FIG. 6 is a diagram of the pedestrian foot of FIG. 5, for demonstrating the size of the foot.
Figure 7:
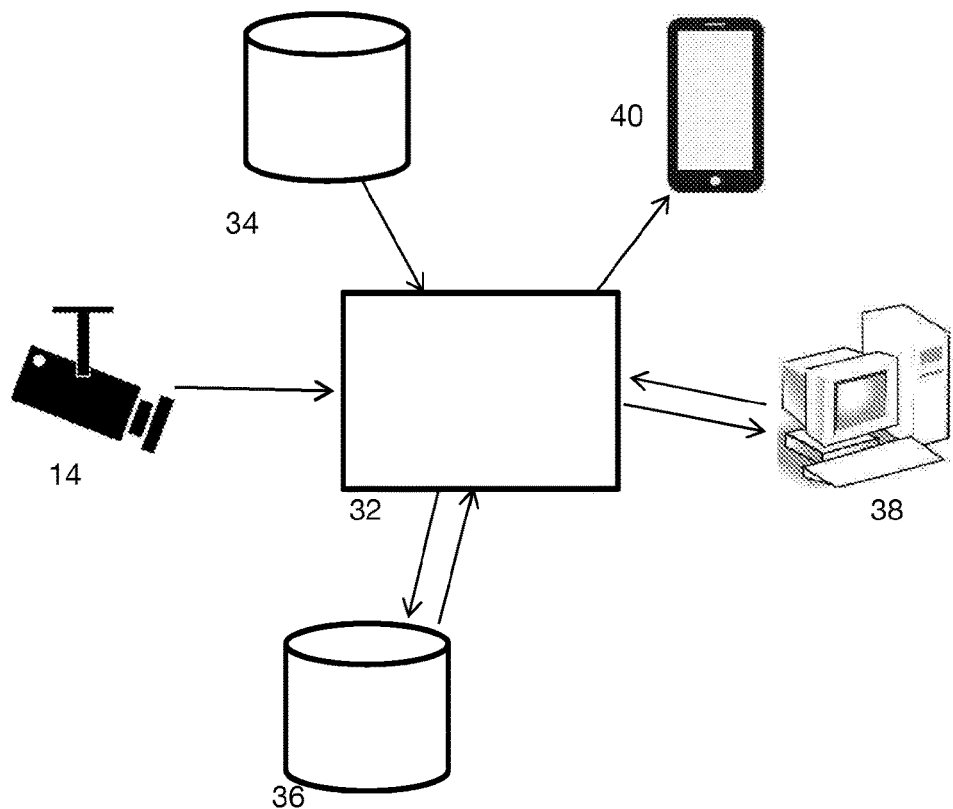
FIG. 7 is a diagram showing the interaction of hardware elements of embodiments of the invention.

As an example only, calibration may be performed using static benchmarks disposed across the doorway. These may be used to determine information about the downwards angle of the camera (see FIGS. 5 and 6). The marks consist of spaced markings width-wise and/or length-wise across the doorway (see FIG. 5 and FIG. 6 respectively). The markings may be physically marked on the ground in the target zone, using black or white paint, using a projector, or using a reflector material and a UV, infa-red, or other suitable camera to detect the markings. Since the camera is inclined downwardly across the doorway, an object further away appears at a higher position in the field of view of the image capture device 14. The markings provide a benchmark for the camera to detect the distance of a given object in the case of width-wise markings (FIG. 5), or a benchmark directly as to the size of the object using the length-wise markings (FIG. 6). As such it can estimate the size of the object.

Of course, once the image capture device has been set up, and calibrated, the benchmark doorway markings may be removable.

In embodiments, the system 10 may perform calibration automatically, by projecting markings relative to the image capture devices 14, and using those projected markings to perform calibration as described above.

The computer system 32 can be any suitable type of known computing system, having a processor and a memory device. The computer system 32 is operable to receive the or each image captured by the image capture device 14. The computer system 32 includes a storage device 36 configured to store information about the number of pedestrians observed (e.g. over a particular period of time). In addition, the storage device 36 may be configured to store determined demographic property associated with the pedestrians captured by the image capture device 14. This data can be stored on and generally accessed via the computer system 32, or may alternatively be stored at a location remote from the computer system 32 itself, and accessed via a local network, or via remote communications (such as via WIFI or via the internet, for example).

In embodiments, the system 10 further includes a reporting system adapted to communicate the determined demographic property of the pedestrian to a user. The user may access the communicated data via a remote handheld device 40, for example, or via a personal computer 38 over an internet or network connection, for example.

Figure 3:
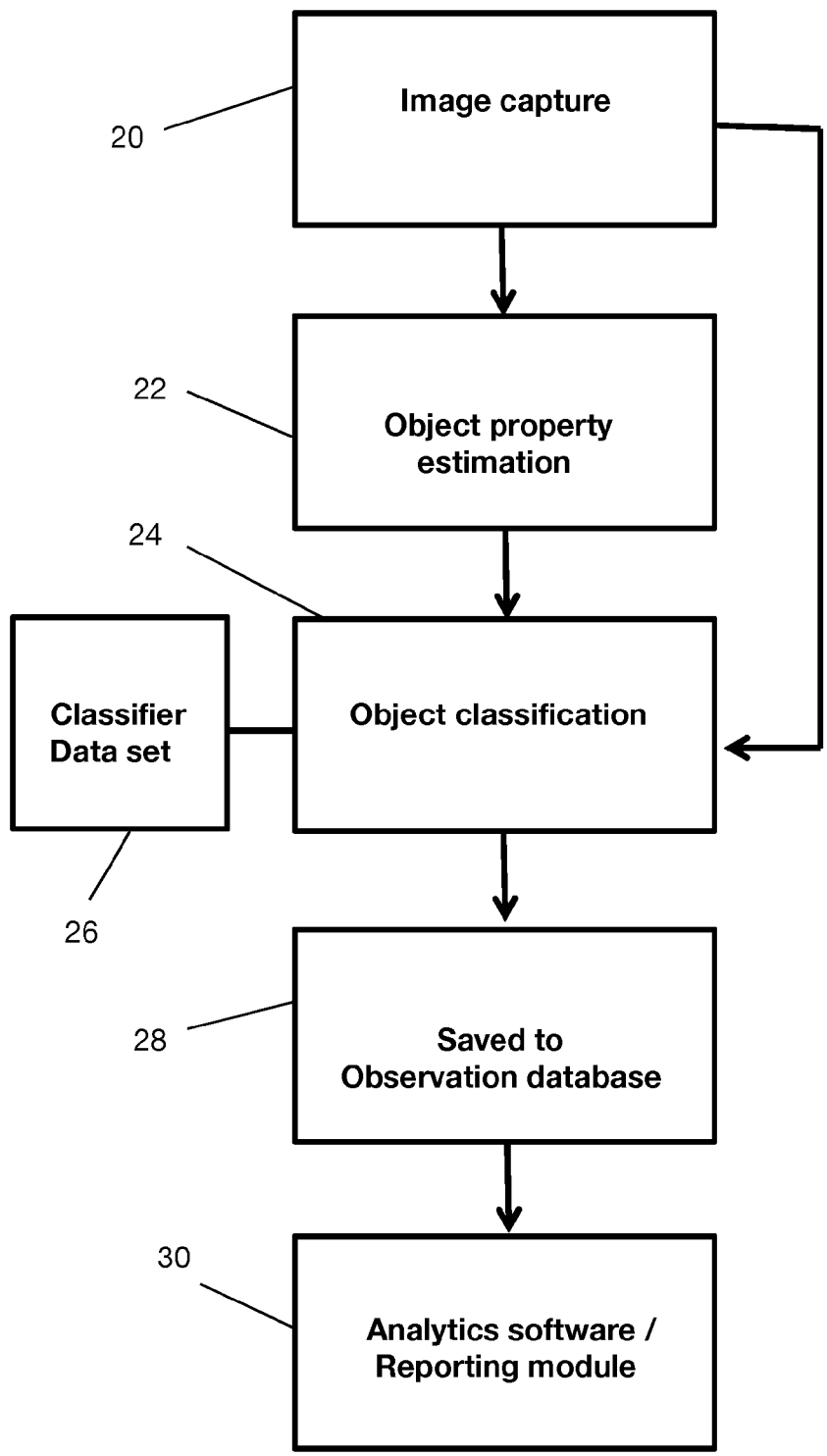
FIG. 3 is a flow diagram representing a method according to embodiments of the invention.

In broad terms, as shown in FIG. 3, the system 10 operates as follows. The system 10 captures images 20 of the target doorway, from which properties of the objects (i.e. shoes) in the images are estimated 22. For example, the system 10 may estimate the size of a shoe, or the colour of a shoe, observed in the image. The object is then classified by comparison to data previously observed, or a dataset provided to the system 10 (e.g. classifier dataset 26), or by one or more rules stored by the system 10. The newly observed object and data about that object may be stored to a database of observations 28, and that data may be used by analytics software and/or a reporting module 30 to provide data to a user.

In more detail, and with reference to FIG. 8 of the drawings, a method of operation according to embodiments of the invention is set out. In an image capture step 102, data (i.e. images) are captured. The data are then assessed to determine whether any motion has occurred within the area of the doorway. To make this assessment, knowledge of the 'default' background view is obtained. In other words—when no pedestrians pass through the doorway, the image capture device provides consecutive identical image data, so it is advantageous for the system 10 to have knowledge of this background image. In this way, when the image changes, it is possible to assess which part of the image concerns a pedestrian moving across the field of view, and which parts of the image merely concern the stationary background.

In embodiments, the system 10 determines whether consecutive images indicate that the background has changed (step 104). For example, if a pedestrian places a bag in the doorway, that bag may appear in many consecutive images obtained by the image capture device 14. If a sequence of images obtained by the image capture device 14 is identical, for a predetermined length of sequence, the background information stored by the system 10 is updated to reflect that change (step 106).

To gather data about the 'background' image in view of the image capture device 14, to update the background data (step 106), a plurality of images are chosen as a sample. The sample may contain every tenth image captured, over a predefined period of time, for a predetermined sample size (such as twenty images, for example). From the sample of images, the pixels of the images are analysed, and a median value calculated for each pixel of the frame. The resulting median-averaged image provides an estimation of the background view. For example, if a pedestrian walks through the doorway during the period in which the sample is taken, the shoes and legs of the pedestrian will only feature in a limited proportion of the images, which are captured over a period of time. Since the median value of each pixel is taken, it is safe to assume that the most common pixel value is the background value, and that the pedestrian only appears in a particular pixel for a minority of the images within the sample. Therefore, by taking the median values, foreground objects passing through the field of view are removed from the background image, and data concerning the background only is stored.

The system 10 then determines whether motion has occurred (step 108), by comparing newly captured images with previously captured images (or, in embodiments, with the stored background image). If the images differ, motion has occurred. If motion has occurred, the system 10 may then analyse the image, or a sequence of images, in which motion has been sensed, to determine details of one or more objects (i.e. shoes) present in the images. If no motion is sensed, the system 10 may process recently analysed data to extract information from the objects that have been identified, so that the information can be stored and/or reported to a user.

Where motion is sensed, first, using standard image processing techniques (step 112), the system 10 processes an image 112 using one or more image manipulation techniques such as scaling, shifting, centring, noise reduction, colour correction, normalising, and correction for lens distortion, or the like. This preparatory image processing step may occur before any assessment of motion is made, or may be applied only where motion has been detected, as shown in FIG. 8.

The system 10 may identify a portion of the captured image data that represents a foot of a pedestrian, or an item of footwear, for example. To make this identification, the foreground of the image must be constructed (step 114), to isolate the relevant portion of the image from the background. To obtain data relating to the foreground of the image, the stored background information can be subtracted from the newly acquired data, leaving all non-background data (i.e. foreground data) for analysis.

So, in embodiments, for each pixel in the image, a median pixel value is calculated across a set of image, to obtain a background image. This image is then subtracted from future observed images, to identify active portions of those images.

Figure 4:
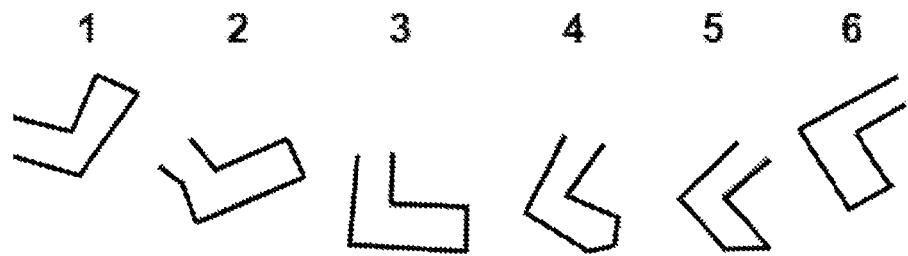
FIG. 4 is a diagram showing relative phase movement of a pedestrian foot during a portion of a walking cycle.

In order to reliably detect the footwear object (and to obtain an accurate estimate of its size and other characteristics), it is preferable to assess spike the object when it is relatively still within the field of view, so that a clear depiction of the object can be obtained. In addition, this is likely to occur whether the shoe is disposed 'flat' within the image. As a pedestrian walks through the target zone, the foot or shoe will move in an angular motion, as illustrated in FIG. 4 of the drawings. It is simplest to measure the size of the foot when it is placed on the ground in its flat position (i.e. image 3 of the series). The computer system 32 may take into account the estimated rotation of the foot by comparing a series of consecutive images to determine the image displaying the object in its 'flattest' state as it passes across the field of view.

In embodiments, to achieve this, a frame averaging technique is used. Frame averaging involves taking a mean average of the foreground data (i.e. to superimpose the image data). In this way, pixels that remain constant between images will bias the averaged value of the pixel towards that constant value. For example, where a pedestrian walks across the field of view, pushing a shopping trolley/cart, the movement of the trolley throughout a sequence of images is fairly regular. In contrast, the movement of a shoe of the pedestrian, as described above, is irregular. There is a position in which the shoe is placed flat against the ground, and at that position the shoe will remain (substantially) stationary for a period before the pedestrian lifts the shoe from the ground. By averaging the image data (i.e. taking the average value of each pixel in the sequence, per pixel) over a sequence of images, much of the foreground image will be blurred, but the portion in which the shoe remains stationary will be highlighted by reinforcement of those pixels that are repeated through multiple images in the sequence. In effect, the repeated portions of the images are superimposed. In this way, a relatively clear image of the shoe can be obtained, and the other objects in the foreground may be disregarded, or discarded.

So, in embodiments, for each pixel, the values of that pixel across a set of (usually consecutive) images are averaged. The resulting averaged image provides enhanced clarity for a portion of the image for which pixel values are constant (or relatively constant) across multiple images in the set.

At this stage, the system 10 detects the identity of one or more objects observed in the foreground. A particular image or sequence of images may contain none, one, or a plurality of shoes. Having identified portions of the data that relate to one or more objects, each of which may be a shoe, the system 10 now identifies the object or objects (step 116).

In embodiments, the computer system 32 is operable to identify a plurality of portions of an image that each include at least a portion of a foot or item of footwear of respective distinct pedestrians. In this way, the system 10 can determine the presence of multiple pedestrians in a given image, or sequence of images, and may use this data to obtain an accurate count of the pedestrians. Also, it allows separate portions of the image to be analysed, separately, to determine demographic information about each respective pedestrian.

Optionally, the identified portion(s) of the image may be processed using image manipulation techniques such as scaling, shifting, centring, noise reduction, or the like, as before, to enhance the clarity of the image.

In preferred embodiments, the computer system 32 has access to a classifier dataset 34. The classifier dataset 34 may be stored on the storage device 36, or may be stored on a separate storage device (which may be disposed at a remote location, but communicatively accessible via the computer system 32, for example). In general terms, the classifier dataset 34 provides information that associates properties of feet or shoes, or observations of feet or shoes, or data relating to feet or shoes, with 'best estimates' of demographic information associated with the owner of said feet or footwear. In other words, the classifier dataset is used to determine, based on an observation of a shoe (or data resembling that shoe), the best estimate of the gender and age of the wearer of the shoe. The classifier dataset 34 may contain previously collected/generated data, with which new data items can be compared.

In embodiments, the classifier dataset 34 is a sample dataset which comprises data previously collected (or otherwise generated) and classified by machine-learning algorithms and/or human users. For example, the sample dataset may comprise ten thousand images of feet and/or shoes. For each image, properties such as size, colour, style, shape, gender and age may be recorded, detailing properties of the wearer of the shoe. For example, one data record might comprise an image of a foot wearing a pink training shoe, with an associated record identifying properties that the shoe is size 4 (UK sizing), that the shoe is a casual shoe, and that the colour of the shoe is pink. Also associated with the data record is a classification of a demographic property, such as a record that the gender of the wearer is female, or that the age of the wearer is 13.

The system 10 typically operates by using a trained classifier algorithm to detect the presence of shoes in the foreground images. The classifier is trained (using known machine-learning methods) to associate particular data with particular features or characteristics (of the types described above, for example). A classifier may be trained to detect the presence of shoes in general, or particular subsets of shoes that have different shapes, for example.

There are two separate elements to the trained classifier—the feature type that the classifier is based on (i.e. how the object is 'described' in the classifier), and the classification method (i.e. how the system decides what is shoe, or a non-shoe, based on the features it has detected). Examples of feature types that can be used are histograms of oriented gradients (which counts occurrences of gradient orientation in portions of an image), or local binary patterns (dividing the image into cells, and comparing each pixel to its neighbours to produce a binary code, and then examining the occurrences of various codes in the resulting data), and variants of the two. It is also possible to use wavelet analysis (using Haar wavelets, or similar) or any other feature detection mechanisms currently used in known object detection systems.

The classifiers may be trained using cascade classifier techniques (i.e. applying a sequence of classifiers, in turn, until a classification is made) or using probabilistic classifiers, support vector machines or neural networks, for example.

In embodiments, the data is generally classified in two distinct sets, relating to left-facing shoes and right-facing shoes. The data sets may be mirrored, containing identical image data reflected about the horizontal mid-point, for example. In this way, the identification of a shoe by classifying an image as belonging to one or other of the data sets provides information about the direction of travel of the pedestrian (i.e. whether the pedestrian is entering or exiting the store).

Once the system 10 has classified an image as relating to a shoe having certain properties (as identified using the classifiers), a primary error checking step (118) is performed. The error check determines whether or not the classifier has misclassified an image as a shoe when in fact it is not, using basic common-sense checks. For example, the size of the shoe detected is examined, given the relative position in the frame. If a very large image is classified as a shoe, when it is located at the furthest-most part of the image from the camera, then the size of that shoe would be too large. If the same size of image was detected close to the camera, that size may be realistic, given the difference in perspective. A shoe above a certain size may be discarded as being incorrectly classified.

As a secondary error checking stage (step 120), additional checks include checks for errors occurring across sequential images. Classification errors are less likely to persist between sequential images than occurring as isolated errors, so the probability assigned to the classification being incorrect may be lowered in this case. Another check is locality of detections—multiple shoe classifications in a small portion of the image may indicate that the same shoe is being identified, so the results of the classifications may be compared and/or combined. Further image processing may be performed at this point, to assist in identifying errors.

Having access to a dataset of example data, each with recorded property values (such as size, style and colour of footwear, the laces, and/or the style of clothes around the ankle), and associated demographic information, enables the computer system to estimate properties of observed images by classifying them appropriately, and/or use the images themselves, to estimate demographic information about the wearer.

So, in other words, the computer system 32 includes an image classification module that is operable to determine a value of the property of the foot or footwear item of the image of the pedestrian, by using classifiers as described above. In this way features are identified (step 122) from the classified images.

In order to better assess what gender the subject is, as well as whether or not the subject is a child (this is important to determine whether a family unit is present), the size of the foot is an important indicator. On average, females have a smaller foot size than males, and as such, estimating the size of a foot of the subject is an import input in accurately assessing the person's gender.

One or more properties of the shoe/footwear (the 'object') are then determined. The size and orientation of the shoe may be measured by deducting the background image data from the shoe image (i.e. the processed foreground data, restricted to a particular instance identified as a shoe). Spikes in the gradient along the X and Y-axis are identified, denoting changes in observed colour at the back, base or front of the shoe. In embodiments, a Sobel operator is implemented to emphasise edge transitions, to pronounce the gradient along the axes. The size can be estimated according to the length of the shoe, measured in pixels, which can be converted to a length measurement given knowledge of the depth of the observation across the field of view (as determined by the calibration step).

So, in an example, an image that is observed to have a very large foot/shoe size is likely to belong to a male. By comparing the size of the observed image with the sizes of shoes in the sample dataset, it will be seen that a high proportion of shoes of a similar size are associated with pedestrians known to be males. Based on this, the system 32 determines that there is a correspondingly high likelihood that the observed image is of a shoe worn by a male.

As another example, the dataset may show that 65% of the images associated with the colour property 'pink' are associated with the demographic property that the wearer is female. The dataset may also show that there is an 80% ratio of men to women having a particular large shoe size. Where an image is captured that is determined to include a pink shoe of that large shoe size, the computer system 32 must use the information available to it to estimate the likely gender of the wearer. In this case, it determines that there is a higher likelihood that he large pink shoe belongs to a male than to a female, based on the evidence of the sample dataset. Therefore, on that basis, the pedestrian identified by the captured image is determined to be a male.

In another method, the computer system 32 may compare the observed image to image data stored in the sample dataset. Known image comparison methods may be used to determine the proximity of the observed image to each of the sample images in the dataset (such as viewing each image as a high-dimension vector array based on its pixel data and comparing the proximity of the vectors, for example). Classification algorithms such as K-nearest neighbour algorithms, for example, can then be used to identify the most likely demographic classification with which to label the pedestrian associated with the captured image. Of course, many suitable algorithms and methods for calculating image similarity are known, and it is envisaged that any suitable method may be used in the context of the present invention.

Of course, the classifier dataset 34 may contain information relating to the trained classifier, rather than the data on which the classifier is or was trained. So, for example, the classifier dataset 34 contains data relating such as values of class boundaries, defining the extent to which data samples sharing the same classification are similar to one another.

In such embodiments, the classifier dataset 34 contains classifier rules to be applied to values of properties of newly-observed data. For example, having analysed a large dataset of sample observations, it may be determined that a shoe having a length greater than a particular value is most likely to belong to a male, and below that value the shoe is most likely to belong to a female. This rule allows future observations to be classified quickly and easily. Far more complex classifier rules may provide functions mapping shapes of footwear to estimates of the age of the wearer, for example.

Once the object has been classified according to the demographic categories of interest, the observation is logged (step 124) and may be stored in an observation database 28. The stored data in the observation database may then be accessed by the analytics software 30 and by the reporting system, for reporting the collated results to a user.

Where the system 10 has logged shoes that have been detected, the system 10 is operable to count pedestrian footfall. As observations of pedestrians walking through the target zone are obtained, and sorted into demographic categories, counters in the system memory, or data stored in memory or on storage devices, may be incremented to keep track of the numbers of pedestrians in the relevant categories.

A model is used to interpolate the data of individual shoe classifications, to a count of pedestrians passing the image capture device 14. This model is used to recognise whether multiple observations of a shoe belong to the same pedestrian, or not. The model bases the outcome on factors including at least one of, but not being limited to: direction of footwear, location of step(s), time detected, shape of footwear, data representative of colour or texture of the shoe and/or leg (such as colour gradient), patterns or logos observed on the footwear. The logos could, for example, be brand logos. The gradient matching may involve sampling colour of the shoe at different pixels and using the difference in colour as a feature when comparing images. This method takes account of different lighting conditions at different locations within the field of view of the camera, caused by shadows, for example. For example, the gradient of colour differential between a blue sock and a white shoe may stay roughly equal in bright sunlight and when cast in shadow, whereas the actual observed colours may differ greatly.

The counting model may include a probabilistic model that assigns a likelihood that pairs (or triplets, for example) of shoes belong to the same pedestrian. This probability model can be applied across a database of shoe observations to predict the total number of pedestrians, and may include an error margin and predicted accuracy of the figures.

An unsupervised machine learning model may be used to predict how many pedestrians have been observed, based on an input of multiple observations of shoes (i.e. the data gathered by the classifiers). Using clustering techniques, the model may learn patterns between groups of classified data, to assess how many pedestrians are observed in a sequence of images—whether multiple images of shoes relate to the same shoe, to the same pedestrian (but perhaps their other shoe), to multiple pedestrians in close proximity, or are due to other irregularities in the classified data. Alternatively, or in addition, linear quadratic estimation (i.e. Kalman filters) may be used recursively to estimate data about the number of pedestrians observed.

It should be noted that, in addition, other computer vision techniques such as 'blob tracking', comparison of the subject to other observations of shoes in the frame (including the direction of movement, patterns of movement and the angle of the shoes and lower legs), and local caching into memory of the shoe or its features may be used to improve object detection and discourage double counting (i.e. incrementing the counter twice for both shoes of one person).

Once the system 10 has counted the number of pedestrians identified in an image, or sequence of images, further demographic information is extracted and earlier demographic estimations updated (step 128) from the classified information by assessment of the features in each footwear observation and a combination thereof. New information may include stride length, walking speed and the direction in which the pedestrian walks. Further information, such as how pedestrians are grouped, can be inferred—for example whether they are congregated as couples, families or as single people.

The analytics module may form part of the computer system 32 itself or may be provided remotely from the computer system 32. For each pedestrian that is observed, the analytics module may be configured to communicate the determined demographic classification to a user of the system. In preferred embodiments, the module communicates with a user periodically, to provide collated data observed and classified in a given period of time. For example, the system may report to the user once per hour, once per day, or once per week. The data conveyed to the user may include demographic classification data including the estimated gender and age of the pedestrians observed, and any other related data (the specific data provided may be specified by the user). The data may be provided via a website, via a web portal, or via a digital message (such as email, SMS, or the like). In other embodiments, the system may collate the data and store the collated data on the storage device 36.

In embodiments, the reporting system and/or analytics software are web-based, and located in 'the cloud'. The data are uploaded via the internet at regular time intervals to the cloud storage provider. The data are collated in and relevant performance metrics are calculated. When a user wants to 'consume' (i.e. access) the data relating to customer demographics and footfall, a local web application is used which downloads the data from the cloud and presents it to the user for their consideration. The data may also be available through an API to enable compatibility with existing management information systems.

It should be understood that features of the embodiments described herein may be used in any combination, unless it is stated otherwise.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A system for monitoring pedestrian footfall, the system including:
a data capture system including an image capture device located at a target zone through which pedestrians pass;
a computer system communicatively coupled to the data capture system and configured to receive data from the data capture system representative of a portion of a pedestrian, including data representing a plurality of images relating to at least a foot or item of footwear of one or more pedestrians;
wherein the computer system is operable to:
identify a first observation of a foot or item of footwear of a pedestrian in a portion of a first image and identify a second observation of a foot or item of footwear of a pedestrian in (i) another portion of the first image or (ii) a portion of a second image, using an image classification algorithm,
compare the first observation to the second observation based on at least (i) an angle or direction of movement of the foot or item of footwear and (ii) relative locations of the first and second observations in the first image or in the first and second images to determine whether the first and second observations are of the same pedestrian; and
count a number of pedestrians observed over a time interval.

2. A system according to claim 1, wherein the system is operable to determine a demographic property of each pedestrian based on the data representative of the foot or item of footwear of the pedestrian.

3. A system according to claim 2, further including a reporting system adapted to communicate the determined demographic property of the pedestrian to a user.

4. A system according to claim 2, wherein the computer system is further configured to communicate the determined demographic property classification to a user.

5. A system according to claim 2, wherein the system is operable to collate demographic data associated with a plurality of pedestrians.

6. A system according to claim 1, wherein the system is configured to record a time of monitoring associated with each pedestrian monitored by the system.

7. A system according to claim 1, wherein the comparison of a first observed foot or item of footwear to further observations of a foot or item of footwear identified in a subsequent image, is further based on a time of detection and a location of the foot or item of footwear identified.

8. A system according to claim 1, wherein the image capture device is positioned at between 300 mm and 1000 mm above floor level.

9. A system according to claim 1, wherein the computer system is operable to compare the identified foot or item of footwear in a plurality of consecutive images to determine a selected one of those images in which the foot or item of footwear is observed in a flattest state.

10. A system according to claim 1, wherein the computer system is calibrated to determine a size of the foot or item of footwear based at least in part on a height-wise position of the foot or item of footwear in the image.

11. A system according to claim 1, wherein the computer system is operable to count the number of pedestrians observed over a time interval using a probabilistic model that assigns a likelihood that pairs of observed feet or items of footwear belong to a single pedestrian, such that the count comprises a predicted number of pedestrians and an estimation of the accuracy of that prediction.

12. A method of monitoring pedestrian footfalls, the method including the steps of:
capturing data representing a portion of a pedestrian using an image capture device located at a target zone through which pedestrians pass;
communicating data representative of the portion of a pedestrian to a computer system, including data representing a plurality of images relating to at least a foot or item of footwear of one or more pedestrians;
identifying using the computer a first observation of a foot or item of footwear of a pedestrian in a portion of a first image and identifying using the computer a second observation of a foot or item of footwear of a pedestrian in (i) another portion of the first image or (ii) a portion of a second image, using an image classification algorithm, comparing, using the computer, the first observation to the second observation based on at least (i) the angle or direction of movement of the foot or item of footwear and (ii) relative locations of the first and second observations in the first image or in the first and second images to determine whether the first and second observations are of the same pedestrian and the presence of a pedestrian; and counting the number of pedestrians observed over a time interval.

13. A method according to claim 12, further including determining using the computer a demographic property of the pedestrian based on the data representative of the foot or item of footwear of the pedestrian.

14. A method according to claim 13, further including a step of communicating the determined demographic property classification to a user.

15. A method according to claim 12, further including a step of determining at least one property of the foot or item of footwear.

16. A method according to claim 15 wherein a property of the foot or item of footwear is the size of the foot or item of footwear.

17. A method according to claim 12, including a step of recording a time of monitoring associated with each pedestrian monitored by the system.

18. A method according to claim 12, wherein the step of comparing a first observed foot or item of footwear to further observations of a foot or item of footwear identified in a subsequent image, comprises making the comparison based at least in part on a time of detection and a location of the foot or item of footwear identified.

19. A method according to claim 12, wherein the step of capturing data representing a portion of a pedestrian using an image capture device further includes a prior step of positioning the image capture device at between 300 mm and 1000 mm above floor level.

20. A method according to claim 12, further comprising comparing the identified foot or item of footwear in a plurality of consecutive images to determine a selected one of those images in which the foot or item of footwear is observed in a flattest state.

21. A system for monitoring pedestrian footfall, the system including:
a data capture system including an image capture device located at a target zone through which pedestrians pass;
a computer system communicatively coupled to the data capture system and configured to receive data from the data capture system representative of a portion of a pedestrian, including data representing a plurality of images relating to at least a foot or item of footwear of one or more pedestrians;
wherein the computer system is operable to:
identify a first observation of a foot or item of footwear of a pedestrian in a portion of a first image and identify a second observation of a foot or item of footwear of a pedestrian in (i) another portion of the first image or (ii) a portion of a second image,
compare the first observation to the second observation based on at least (i) an angle or direction of movement of the foot or item of footwear and (ii) relative locations of the first and second observations in the first image or in the first and second images to determine whether the first and second observations are of the same pedestrian;
determine a demographic property of each pedestrian based on the data representative of the foot or item of footwear of the pedestrian and
count the number of pedestrians observed over a time interval.

22. A system according to claim 21, wherein the image capture device is positioned at between 300 mm and 1000 mm above floor level.

23. A method of monitoring pedestrian footfall, the method including the steps of:
capturing data representing a portion of a pedestrian using an image capture device located at a target zone through which pedestrians pass;
communicating data representative of the portion of a pedestrian to a computer system, including data representing a plurality of images relating to at least a foot or item of footwear of one or more pedestrians;
identifying using the computer a first observation of a foot or item of footwear of a pedestrian in a portion of a first image and identify a second observation of a foot or item of footwear of a pedestrian in (i) another portion of the first image or (ii) a portion of a second image,
comparing the first observation to the second observation based on at least (i) an angle or direction of movement of the foot or item of footwear and (ii) relative locations of the first and second observations in the first image or in the first and second images to determine whether the first and second observations are of the same pedestrian;
determining using the computer a demographic property of the pedestrian based on the data representative of the foot or item of footwear of the pedestrian, and
counting the number of pedestrians observed over a time interval.

* * * * *

UNITED STATES PATENT AND TRADEMARK OFFICE
CERTIFICATE OF CORRECTION

PATENT NO.       : 10,311,451 B2
APPLICATION NO.  : 15/355652
DATED            : June 4, 2019
INVENTOR(S)      : Owen McCormack Page 1 of 1

It is certified that error appears in the above-identified patent and that said Letters Patent is hereby corrected as shown below:

In the Claims

At Column 12, Line 2, "identity" should be -- identify --.

At Column 14, Line 20, "pedestrian" should be -- pedestrian; --.

Signed and Sealed this
Eighteenth Day of February, 2020

Andrei Iancu
*Director of the United States Patent and Trademark Office*